US012668012B2

(12) United States Patent
Ishida

(10) Patent No.: US 12,668,012 B2
(45) Date of Patent: Jun. 30, 2026

(54) EXTRUDER

(71) Applicant: SUMITOMO HEAVY INDUSTRIES MODERN, LTD., Yokohama (JP)

(72) Inventor: Shoichi Ishida, Yokohama (JP)

(73) Assignee: SUMITOMO HEAVY INDUSTRIES MODERN, LTD., Yokohama (JP)

( * ) Notice: Subject to any disclaimer, the term of this patent is extended or adjusted under 35 U.S.C. 154(b) by 448 days.

(21) Appl. No.: 18/354,682

(22) Filed: Jul. 19, 2023

(65) Prior Publication Data

US 2024/0017463 A1    Jan. 18, 2024

Related U.S. Application Data

(63) Continuation of application No. PCT/JP2022/002806, filed on Jan. 26, 2022.

(30) Foreign Application Priority Data

Jan. 29, 2021    (JP) ................................. 2021-013107

(51) Int. Cl.
B29C 48/685          (2019.01)
(52) U.S. Cl.
CPC .................................. B29C 48/686 (2019.02)
(58) Field of Classification Search
CPC ............................ B29C 48/686; B29C 48/688
USPC .............................................. 366/79, 80, 89
See application file for complete search history.

(56) References Cited

U.S. PATENT DOCUMENTS 2,200,997 A * 5/1940 Royle ................... B29C 48/686
                                                            366/90
2,595,455 A * 5/1952 Heston .................... B29B 7/429
                                                            366/89

2,639,464 A * 5/1953 Magerkurth .......... B29C 48/686
                                                            366/80
2,744,287 A * 5/1956 Parshall .................. B29B 7/425
                                                            425/313
2,765,491 A * 10/1956 Magerkurth .......... B29C 48/686
                                                            366/90
3,102,716 A * 9/1963 Frenkel ................. B29C 48/688
                                                            100/145
3,164,375 A * 1/1965 Frenkel .................. A21C 1/065
                                                            366/89

(Continued)

FOREIGN PATENT DOCUMENTS

CN          103722719 A      4/2014
CN          103770310 A      5/2014
(Continued)

OTHER PUBLICATIONS

English translation of DE 102017207357 A1 (Year: 2025).*

(Continued)

*Primary Examiner* — David L Sorkin
(74) *Attorney, Agent, or Firm* — WTA IP Law P.C.

(57)          ABSTRACT

An extruder includes a cylinder and a screw that is accommodated in the cylinder, in which an inner peripheral surface of the cylinder includes first and second groove formed regions each of which has a groove formed therein, in the first groove formed region, a height of a mountain portion forming the groove is constant, and a presence range of the second groove formed region in an axial direction at least partially overlaps a presence range of a material feed port in the axial direction, and a height of a mountain portion forming the groove in the second groove formed region is lower than the height of the mountain portion of the first groove formed region.

5 Claims, 5 Drawing Sheets

22

(56)  References Cited

U.S. PATENT DOCUMENTS

| | | | | |
|---|---|---|---|---|
| 3,325,865 A * | 6/1967 | Dunnington | ............ | B29C 48/56 366/89 |
| 4,125,333 A * | 11/1978 | Fields | .................. | B29C 48/686 366/318 |
| 4,136,969 A * | 1/1979 | Meyer | .................. | B29C 48/686 366/322 |
| 4,253,771 A * | 3/1981 | Renk | ...................... | B29C 48/56 366/89 |
| 4,408,725 A * | 10/1983 | Wenger | ..................... | B02C 9/02 366/90 |
| 4,408,887 A * | 10/1983 | Yamaoka | ................ | B29B 7/422 366/82 |
| 4,678,339 A | 7/1987 | Peiffer et al. | | |
| 5,127,741 A * | 7/1992 | Capelle | .................. | B29C 48/67 366/89 |
| 5,694,833 A * | 12/1997 | Wenger | .................. | A23K 40/20 366/82 |

FOREIGN PATENT DOCUMENTS

| | | | | | |
|---|---|---|---|---|---|
| CN | 104608362 | B | | 1/2018 | |
| DE | 102017207357 | A1 * | 9/2018 | ........... | B29C 48/501 |
| JP | 53-022562 | A | | 3/1978 | |
| JP | S54-23661 | A | | 2/1979 | |
| JP | S57-136725 | U | | 8/1982 | |
| JP | 59-067030 | A | | 4/1984 | |
| JP | 60-250931 | A | | 12/1985 | |
| JP | 06-091727 | A | | 4/1994 | |
| JP | H6-126807 | A | | 5/1994 | |
| JP | H08-230016 | A | | 9/1996 | |
| JP | 2018-196970 | A | | 12/2018 | |
| PL | 198263 | B1 | | 6/2008 | |
| PL | 219984 | B1 | | 8/2015 | |
| PL | 232597 | B1 | | 6/2019 | |

OTHER PUBLICATIONS

International Search Report of PCT/JP2022/002806, mailed on Mar. 15, 2022.

European Search Report of EP Application No. 22745905.4 Mailed on Jun. 19, 2024.

Office Action of the corresponding CN Application No. 202280011970.4 Mailed on Jan. 21, 2026.

Office Action of the corresponding JP Application No. 2022-578439 Mailed on Jan. 13, 2026.

* cited by examiner

22

22

EXTRUDER

CROSS-REFERENCE TO RELATED APPLICATIONS

This is a bypass continuation of International PCT Application No. PCT/JP2022/002806, filed on Jan. 26, 2022, which claims priority to Japanese Patent Application No. 2021-013107, filed on Jan. 29, 2021, which are incorporated by reference herein in their entirety.

BACKGROUND

Technical Field

A certain embodiment of the present invention relates to an extruder.

Description of Related Art

An extruder that includes a cylinder to which a heater is attached and a screw accommodated in the cylinder, in which a forming material melts due to heating by the heater or the like, and the molten forming material is extruded from an extrusion port of the cylinder.

SUMMARY

According to an embodiment of the present invention, there is provided an extruder including a cylinder and a screw that is accommodated in the cylinder. An inner peripheral surface of the cylinder includes first and second groove formed regions each of which has a groove formed therein. In the first groove formed region, a height of a mountain portion forming the groove is constant. At least a part of the second groove formed region overlaps a material feed port when viewed from a circumferential direction, and a height of a mountain portion forming the groove of the second groove formed region is lower than the height of the mountain portion of the first groove formed region.

DETAILED DESCRIPTION

There is a demand for increasing an extrusion amount of the extruder per unit time. When an inflow amount of a forming material to the cylinder per unit time increases, the extrusion amount also increases. When the inner diameter of the cylinder increases, the inflow amount increases, but the size of the extruder increases so that a space necessary for provision increases, and manufacturing costs of the extruder increase as well.

The present invention is devised in view of such circumstances, and it is desirable to provide a technique in which an inflow amount of a forming material to an extruder can be increased without increasing the size of the extruder.

Any combination of the components described above and a combination obtained by switching the components and expressions of the present invention between methods, devices, and systems are also effective as an aspect of the present invention.

Hereinafter, an embodiment for carrying out the present invention will be described in detail with reference to the drawings. In the description of the drawings, the same elements will be assigned with the same reference signs, and redundant description will be omitted as appropriate.

Figure 1:
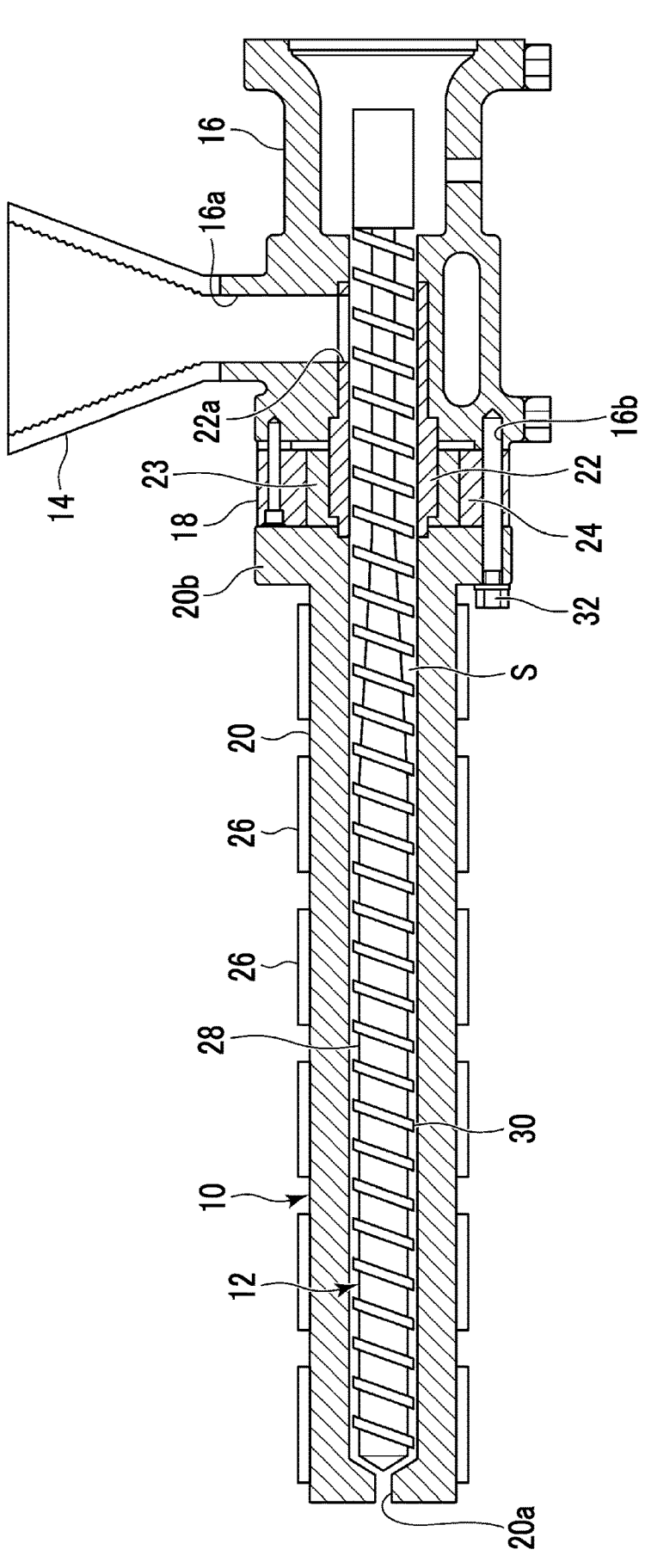
FIG. 1 is a sectional view of an extruder according to an embodiment of the present invention.

FIG. 1 is a sectional view of an extruder 100 according to an embodiment. FIG. 1 is a sectional view of the extruder 100 cut along a vertical section including a center axis C of a cylinder 10 (to be described later). The extruder 100 is connected to an inflation film forming machine, a cast film forming machine, a laminator device, or other devices and feeds a molten forming material thereto.

The extruder 100 includes a cylindrical cylinder 10, a screw 12 that is accommodated in the cylinder 10, a hopper 14 that is filled with a forming material and that is for feeding the forming material to one end side (hereinafter, referred to as an upstream side) of the cylinder 10, and a support member 16 that supports the upstream side of the cylinder 10 and that supports the hopper 14.

Hereinafter, description will be made with a direction parallel to the center axis C of a cylindrical internal space S of the cylinder 10 defined as an axial direction, any direction passing through the center axis C on a plane perpendicular to the center axis C defined as a radial direction, and a direction along a circumference of a circle about the center axis C on the plane perpendicular to the center axis C defined as a circumferential direction.

The cylinder 10 includes a first cylinder portion 18 and a second cylinder portion 20 in order from upstream. The first cylinder portion 18 and the second cylinder portion 20 are cylindrical members having substantially the same inner diameter and are coaxially connected to each other.

The first cylinder portion 18 includes a cylindrical main body 22, a cooling unit 23 that surrounds a downstream side of the main body 22, and a cover portion 24 that surrounds the cooling unit 23. The main body 22 and the cooling unit 23 are bonded to each other through welding, and the cooling unit 23 and the cover portion 24 are bonded to each other through welding.

A material feed port 22a that is an opening is formed on an upstream side of an outer peripheral surface of the main body 22. A refrigerant flow path (not shown) is formed in the cooling unit 23. A refrigerant such as cooling water flows in this flow path. The cooling unit 23 surrounds the downstream side of the main body 22 as described above and thereby cools the downstream side of the main body 22. The refrigerant flow path (not shown) is formed also in the support member 16. An upstream side of the main body 22 is cooled by the support member 16 that surrounds the upstream side. When a forming material melts in the first cylinder portion 18, a propulsive force is lost and the forming material does not proceed to the downstream side. This can be avoided by cooling the main body 22 with the cooling unit 23.

A plurality of heaters 26 are wound around an outer periphery of the second cylinder portion 20. The heaters 26 heat an inside of the second cylinder portion 20 to a temperature at which a forming material melts. An extrusion port 20a through which the molten forming material is extruded is formed in an end surface of the second cylinder portion 20 on the downstream side.

As a bolt 32 is inserted into a flange portion 20b of the second cylinder portion 20 and the cover portion 24 of the first cylinder portion 18 in the axial direction and is screwed with a screw hole 16b formed in the support member 16, the second cylinder portion 20 and the first cylinder portion 18 are co-tightened and fixed to the support member 16.

The screw 12 is accommodated in the internal space S of the cylinder 10. The screw 12 includes a screw shaft 28 having a circular section extending in the axial direction and a spirally extending screw flight 30 formed on an outer periphery of the screw shaft 28. The screw 12 is rotationally driven by a rotational drive unit (not shown) connected to one end side thereof and rotates about a center axis of the screw shaft 28 inside the internal space S. The screw 12 moves a forming material toward the extrusion port 20a in response to this rotation.

The support member 16 supports the upstream side of the cylinder 10 and supports the hopper 14. The upstream side of the main body 22 of the first cylinder portion 18 is fitted into the support member 16, and the material feed port 22a is positioned inside the support member 16. A communication hole 16a that communicates with an inside of the hopper 14 and an inside of the main body 22 of the first cylinder portion 18 is formed in the support member 16.

The hopper 14 is filled with a forming material. The forming material falls from the hopper 14 to the communication hole 16a of the support member 16 and is fed to the inside of the main body 22, that is, the internal space S of the cylinder 10 through the material feed port 22a.

The above is the basic configuration of the extruder 100. Next, an operation thereof will be described. A forming material filling the hopper 14 falls to the communication hole 16a of the support member 16 and flows into the internal space S of the cylinder 10 through the material feed port 22a. The forming material that has flowed in moves to the downstream side in response to the rotation of the screw 12. In this case, the forming material melts due to heat from an inner wall surface of the cylinder 10 (that is, heating by the heater 26) or shearing heat generated by being sheared by the screw 12. The molten forming material is extruded from the extrusion port 20a.

Next, a configuration of the main body 22 of the first cylinder portion 18 will be described in detail.

Figure 2:
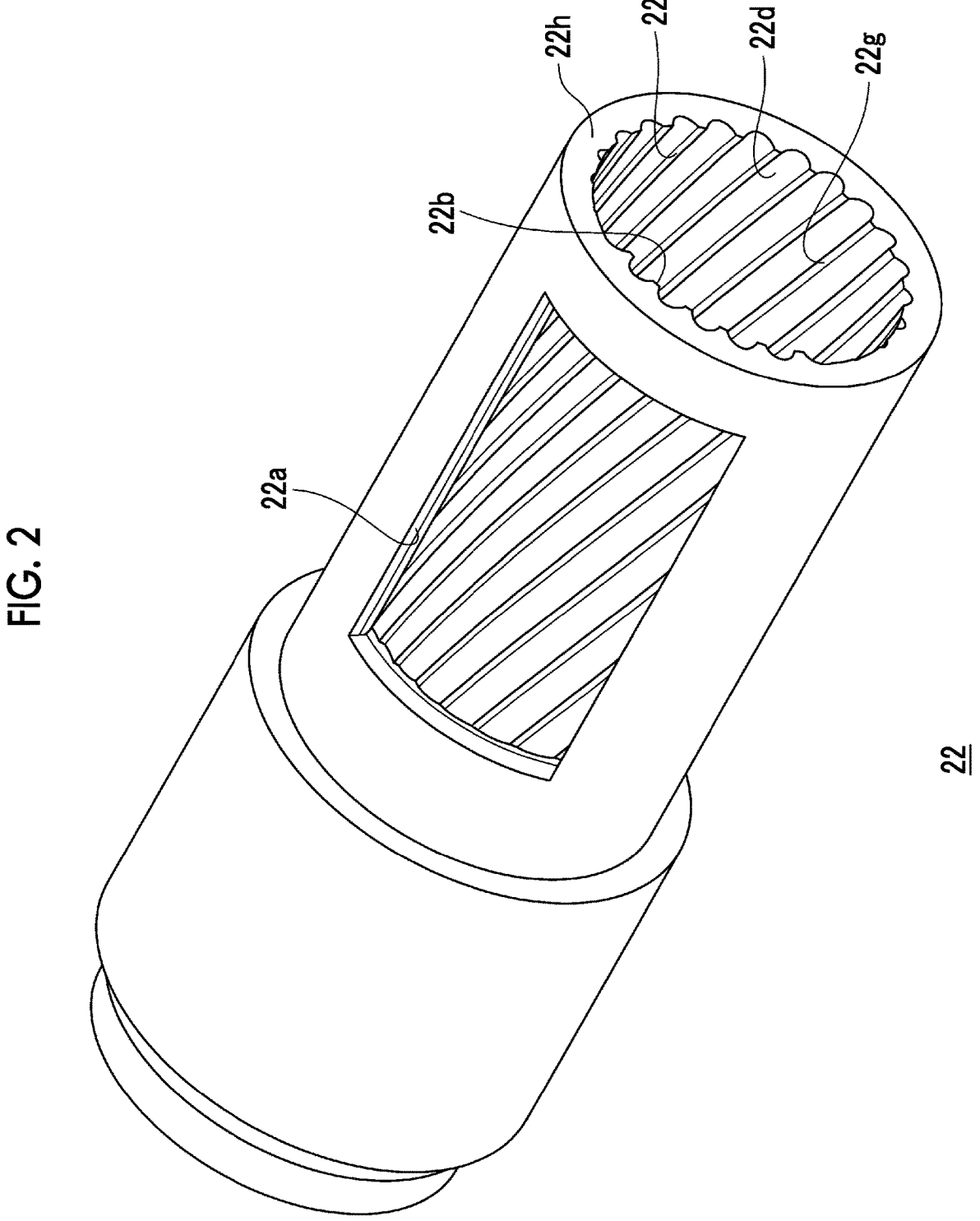
FIG. 2 is a perspective view of a main body of a first cylinder portion of FIG. 1.
Figure 3:
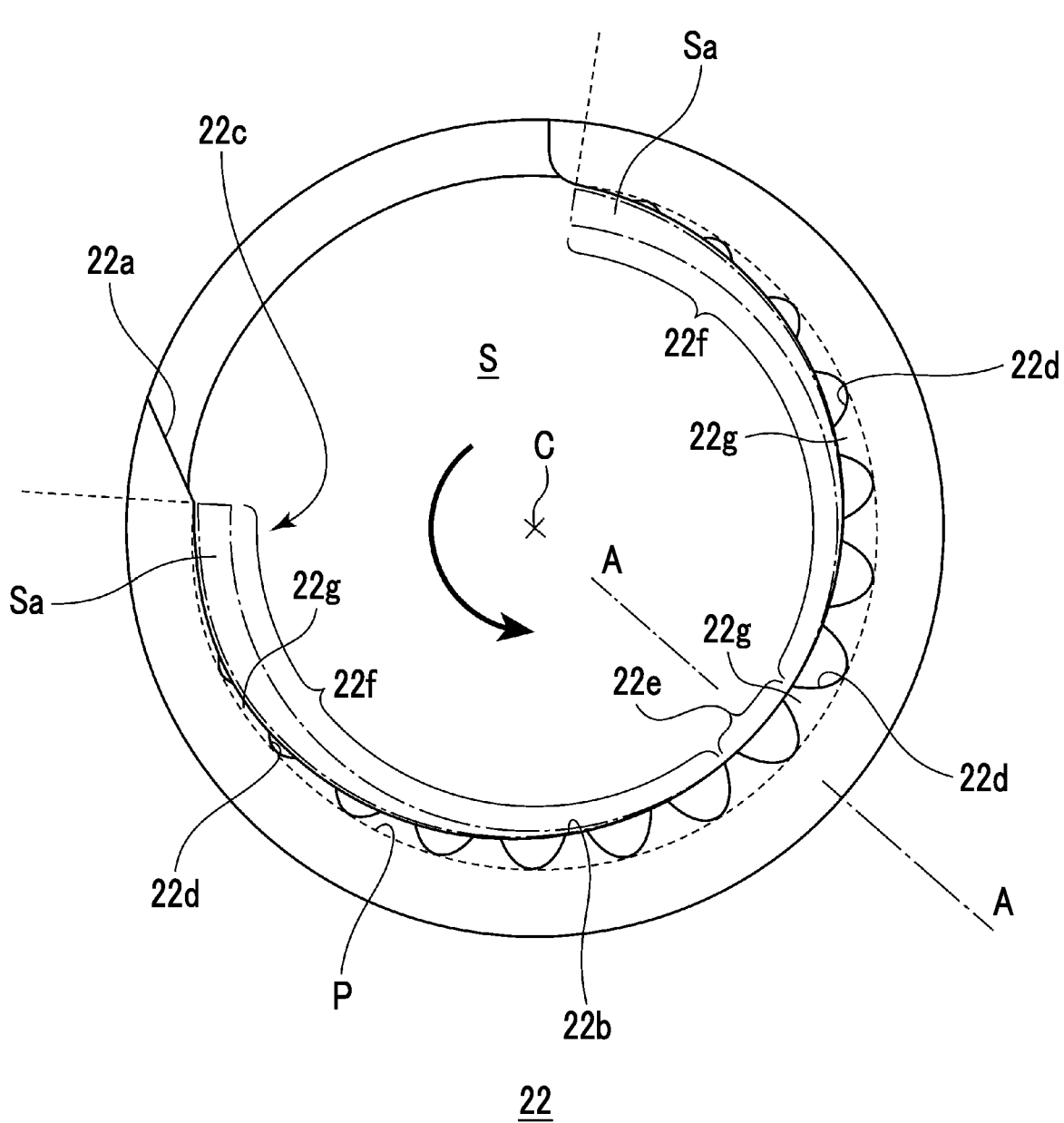
FIG. 3 is a sectional view of the main body of the first cylinder portion of FIG. 1.
Figure 4:
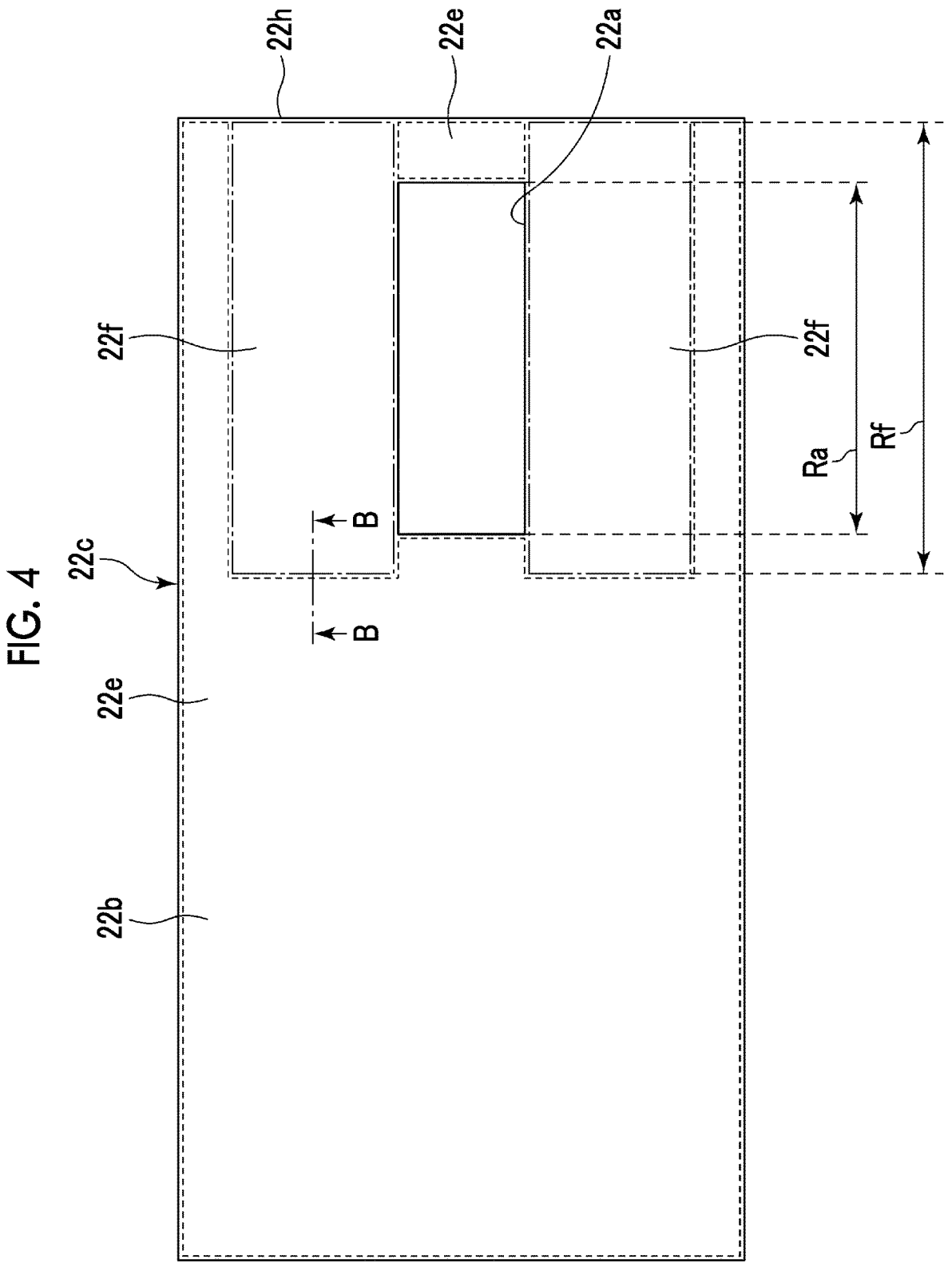
FIG. 4 is a development view of the main body, which is cut along line A-A in FIG. 3 and is developed.

FIGS. 2 to 4 are views showing the main body 22. FIG. 2 is a perspective view of the main body 22. FIG. 3 is a sectional view of the main body 22 cut along a vertical section perpendicular to the center axis C, the vertical section crossing the material feed port 22a. An arrow in FIG. 3 indicates a rotation direction of the screw 12 (not shown in FIG. 3). FIG. 4 is a development view of the main body 22, which is cut along line A-A in FIG. 3 and is developed. In FIG. 4, a groove 22d is not shown.

An inner peripheral surface 22b of the main body 22 includes a groove formed region 22c that is a region where the groove 22d is formed. Although the main body 22 of the present embodiment is not particularly limited, the groove formed region 22c is included over the entire inner peripheral surface 22b. As the groove 22d is formed in the inner peripheral surface 22b of the main body 22, a shape friction effect between the inner peripheral surface 22b of the main body 22 and a forming material is enhanced, and a transport force of the forming material improves.

The groove 22d is a groove that spirally extends along the axial direction. As the groove 22d spirally extends, a high shape friction effect is obtained compared to other cases. In addition, a direction of a spiral of the groove 22d is a direction opposite to a direction of a spiral of the screw flight

30, and a high shape friction effect is obtained compared to a case of the same direction. When a high shape friction effect is obtained, a transport force of a forming material improves. The groove 22d is not limited to a groove that spirally extends and may be, for example, a groove that linearly extends in the axial direction.

The groove formed region 22c includes a first groove formed region 22e and a second groove formed region 22f. In FIG. 4, a region surrounded by a dotted line is the first groove formed region 22e, and a region surrounded by a one-dot chain line is the second groove formed region 22f.

The first groove formed region 22e is a region where the height of a mountain portion 22g forming the groove 22d is constant. In other words, the first groove formed region 22e is a region where a distance from the center axis C to the top of the mountain portion 22g is constant. The "height" of the mountain portion 22g is a distance between a cylindrical reference surface P about the center axis C and the top of the mountain portion 22g in the radial direction. In this example, the reference surface P is a cylindrical surface that passes through a deepest portion of the groove.

The second groove formed region 22f is a region where the height of the mountain portion 22g forming the groove 22d is lower than the height of the mountain portion 22g of the first groove formed region 22e. In other words, the second groove formed region 22f is a region where a distance from the center axis C to the mountain portion 22g is long. The second groove formed region 22f is not particularly limited, but in this example, as the mountain portion 22g is farther from the material feed port 22a, the mountain portion 22g is higher. In other words, as the mountain portion 22g is farther from the material feed port 22a, the distance from the center axis C to the mountain portion 22g increases. In addition, the second groove formed region 22f is not particularly limited, but in this example, as each mountain portion 22g is farther from the material feed port 22a, the mountain portion 22g is higher. In other words, as each mountain portion 22g is farther from the material feed port 22a, the distance from the center axis C increases.

The second groove formed region 22f is provided such that a presence range Rf thereof in the axial direction (a right-left direction in FIG. 4) at least partially overlaps a presence range Ra of the material feed port 22a in the axial direction.

In the shown example, the second groove formed region 22f is provided such that the presence range Rf in the axial direction is wider than the presence range Ra of the material feed port 22a in the axial direction and overlaps the entire presence range Ra. In other words, the second groove formed region 22f is provided such that the presence range Rf in the axial direction includes the presence range Ra of the material feed port 22a in the axial direction. Further, in other words, the second groove formed region 22f is provided to extend from the upstream side of the material feed port 22a (specifically, an end surface 22h of the main body 22 on the upstream side) to the downstream side of the material feed port 22a.

The second groove formed regions 22f are provided to be close to the material feed port 22a in the circumferential direction and on both sides of the material feed port 22a in the circumferential direction. The second groove formed regions 22f are preferably provided to extend from the material feed port 22a in the circumferential direction (that is, continuous to the material feed port 22a). Although the second groove formed regions 22f are provided on both sides of the material feed port 22a in the circumferential direction in this example, the second groove formed region 22*f* may be provided on only one side of the material feed port 22*a* in the circumferential direction.

On the other hand, the second groove formed regions 22*f* are not formed at portions of the inner peripheral surface 22*b*, which are adjacent to the material feed port 22*a* in the axial direction (portions to the right and to the left of the material feed port 22*a* in FIG. 4), and the first groove formed region 22*e* is formed in this example. It is evident that the invention is not limited thereto, and the second groove formed regions 22*f* may be formed at the portions.

The second groove formed region 22*f* may be formed by scraping the mountain portion 22*g* of the first groove formed region 22*e*. That is, first, the entire groove formed region 22*c* is formed as the first groove formed region 22*e*, and the mountain portion 22*g* of a portion thereof is scraped. Accordingly, a portion of the first groove formed region that forms a second groove formed region may be changed into the second groove formed region 22*f*.

By making the groove formed region 22*c* close to the material feed port 22*a* the second groove formed region 22*f* including the lower mountain portion 22*g*, instead of the first groove formed region 22*e*, the internal space S of the cylinder 10 close to the material feed port 22*a* widens by that amount. In other words, between an imaginary circle passing through an apex of the mountain portion 22*g* of the first groove formed region 22*e* and a line connecting an apex of a mountain portion of the second groove formed region, a space (pocket) Sa where a forming material can enter, which is a space extending in an arc shape, is formed. As the internal space S widens, the inflow amount of the forming material per unit time increases, and as a result, an extrusion amount increases.

In addition, since the second groove formed region 22*f* extends to the downstream side of the material feed port 22*a*, the internal space S widens by forming the second groove formed region 22*f* also on the downstream side of the material feed port 22*a*. By widening the internal space S on the downstream side (that is, an extrusion port 20*a* side) of the material feed port 22*a* while some forming material obliquely fall from the material feed port 22*a* toward the downstream side, the inflow amount of the forming material per unit time further increases, and as a result, the extrusion amount further increases.

Even when the second groove formed region 22*f* extends to the upstream side of the material feed port 22*a*, since the second groove formed region 22*f* is on an opposite side to the extrusion port 20*a*, this hardly or does not contribute to an increase in an extrusion amount. However, in a case where the second groove formed region 22*f* is formed by scraping the mountain portion 22*g* of the first groove formed region 22*e*, processing of forming the second groove formed region 22*f* becomes easy when the second groove formed region extends from the end surface 22*h* of the main body 22.

Figure 5:
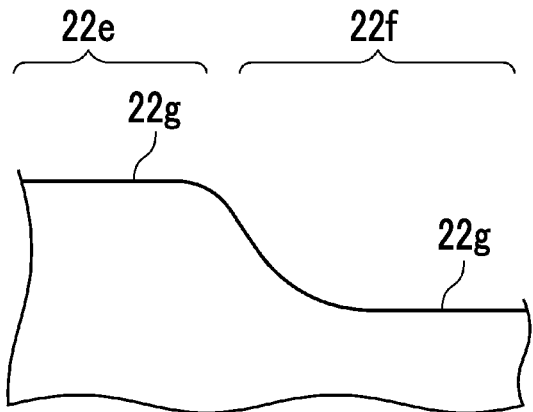
FIG. 5 is a sectional view taken along line B-B of FIG. 4.

FIG. 5 is a sectional view taken along line B-B of FIG. 4. The mountain portion 22*g* of the second groove formed region 22*f* is connected to the mountain portion of the first groove formed region 22*e* via an inclined portion such that a step portion is not formed in the axial direction between the mountain portion 22*g* of the first groove formed region 22*e* and the mountain portion 22*g* of the second groove formed region 22*f*. Accordingly, a flow resistance of a forming material is reduced, and a transport force of the forming material improves compared to a case where the step portion is formed.

In the present embodiment described hereinbefore, a larger extrusion amount can be realized by the extruder 100 having the same size as that of the extruder of the related art. Conversely, the same extrusion amount as that of the extruder of the related art can be realized by the extruder 100 that is smaller than the extruder of the related art.

The present invention has been described hereinbefore based on the embodiment. The embodiment is an example. It is clear for those skilled in the art that various modification examples are possible for a combination of each component and each processing process, and such modification examples are also within the scope of the present invention. Hereinafter, a modification example will be described.

Any combination of the embodiment and the modification example described above is also useful as an embodiment of the present invention. A new embodiment generated by combination has each of the effects of the combined embodiment and modification example.

The present invention relates to the extruder.

It should be understood that the invention is not limited to the above-described embodiment, but may be modified into various forms on the basis of the spirit of the invention. Additionally, the modifications are included in the scope of the invention.

What is claimed is:

1. An extruder comprising:
a cylinder; and
a screw that is accommodated in the cylinder,
wherein an inner peripheral surface of the cylinder includes first and second groove formed regions each of which has a groove formed therein,
in the first groove formed region, a height of a mountain portion forming the groove is constant,
a presence range of the second groove formed region in an axial direction at least partially overlaps a presence range of a material feed port in the axial direction, and a height of a mountain portion forming the groove in the second groove formed region is lower than the height of the mountain portion of the first groove formed region, and
in a section perpendicular to the axial direction, the mountain portion formed in the second groove formed region is higher as the mountain portion is farther from the material feed port.

2. The extruder according to claim 1,
wherein the second groove formed region is provided close to the material feed port in a circumferential direction.

3. The extruder according to claim 2,
wherein the inner peripheral surface of the cylinder further includes a second groove formed region different from the second groove formed region, and
the different second groove formed region is provided close to the material feed port in the circumferential direction and on an opposite side to the second groove formed region with respect to the material feed port.

4. The extruder according to claim 1,
wherein the second groove formed region extends to a downstream side of the material feed port in the axial direction.

5. An extruder comprising:
a cylinder; and
a screw that is accommodated in the cylinder,
wherein an inner peripheral surface of the cylinder includes a first-groove formed region, a first second-groove formed region, and a second second-groove formed region each of which has a groove formed therein, in the first-groove formed region, a height of a mountain portion forming the groove is constant, a presence range of each of the first second-groove formed region and the second second-groove formed region in an axial direction at least partially overlaps a presence range of a material feed port in the axial direction, and a height of a mountain portion forming the groove in each of the first second-groove formed region and the second second-groove formed region is lower than the height of the mountain portion of the first-groove formed region, the first second-groove formed region is provided close to the material feed port in a circumferential direction, the second second-groove formed region is provided close to the material feed port in the circumferential direction and on an opposite side of the first second-groove formed region with respect to the material feed port, the first-groove formed region includes a first circumferential portion and a second circumferential portion which are provided on opposite sides in the circumferential direction with respect to the material feed port, the first circumferential portion, the second circumferential portion, the first second-groove formed region, and the second second-groove formed region are provided at the same axial position, and the first second-groove formed region is provided between the first circumferential portion and the material feed port in the circumferential direction, and the second second-groove formed region is provided between the second circumferential portion and the material feed port in the circumferential direction.

* * * * *